US008676588B2

(12) United States Patent
Ryan et al.

(10) Patent No.: US 8,676,588 B2
(45) Date of Patent: Mar. 18, 2014

(54) SYSTEM FOR HANDLING A PLURALITY OF STREAMING VOICE SIGNALS FOR DETERMINATION OF RESPONSIVE ACTION THERETO

(75) Inventors: Thomas J. Ryan, Conifer, CO (US); Biji K. Janan, Bangalore (IN)

(73) Assignee: Accenture Global Services Limited, Dublin (IE)

(*) Notice: Subject to any disclaimer, the term of this patent is extended or adjusted under 35 U.S.C. 154(b) by 985 days.

(21) Appl. No.: 12/470,592

(22) Filed: May 22, 2009

(65) Prior Publication Data

US 2009/0292531 A1  Nov. 26, 2009

(30) Foreign Application Priority Data

May 23, 2008  (IN) .......................... 1095/MUM/2008

(51) Int. Cl.

| | |
|---|---|
| G10L 21/00 | (2013.01) |
| H04M 3/42 | (2006.01) |
| G10L 15/02 | (2006.01) |
| G10L 15/10 | (2006.01) |
| H04M 3/424 | (2006.01) |
| H04M 3/44 | (2006.01) |
| G10L 15/00 | (2013.01) |
| H04M 1/64 | (2006.01) |

(52) U.S. Cl.
USPC .......... 704/270.1; 704/231; 704/236; 379/70; 379/74; 379/88.01; 379/142.07; 379/211.01

(58) Field of Classification Search
USPC .............. 704/200–201, 231–257, 270–270.1, 704/271, 275, E15.001–E15.05, 704/E21.001–E21.02; 379/67.1–87, 379/88.01–88.27, 142.01–142.18, 379/201.01–218.02
See application file for complete search history.

(56) References Cited

U.S. PATENT DOCUMENTS 4,757,267 A * 7/1988 Riskin ...................... 379/114.24
(Continued)

FOREIGN PATENT DOCUMENTS

| DE | 1992051 A | 11/2000 |
|---|---|---|
| DE | 19920510 A1 | 11/2000 |
| WO | 2008021461 A2 | 2/2008 |

OTHER PUBLICATIONS

European Search Report issued Nov. 13, 2009 for Application No. 09160936.2-2414.

(Continued)

*Primary Examiner* — Pierre-Louis Desir
*Assistant Examiner* — David Kovacek
(74) *Attorney, Agent, or Firm* — Harrity & Harrity, LLP

(57) ABSTRACT

Streaming voice signals, such as might be received at a contact center or similar operation, are analyzed to detect the occurrence of one or more unprompted, predetermined utterances. The predetermined utterances preferably constitute a vocabulary of words and/or phrases having particular meaning within the context in which they are uttered. Detection of one or more of the predetermined utterances during a call causes a determination of response-determinative significance of the detected utterance(s). Based on the response-determinative significance of the detected utterance(s), a responsive action may be further determined. Additionally, long term storage of the call corresponding to the detected utterance may also be initiated. Conversely, calls in which no predetermined utterances are detected may be deleted from short term storage. In this manner, the present invention simplifies the storage requirements for contact centers and provides the opportunity to improve caller experiences by providing shorter reaction times to potentially problematic situations.

27 Claims, 5 Drawing Sheets

(56) References Cited

U.S. PATENT DOCUMENTS

| | | | |
|---|---|---|---|
| 5,036,539 A * | 7/1991 | Wrench et al. ................. 704/246 |
| 5,068,888 A * | 11/1991 | Scherk et al. ............. 379/100.11 |
| 5,163,081 A * | 11/1992 | Wycherley et al. .............. 379/52 |
| 5,479,491 A * | 12/1995 | Herrero Garcia et al. . 379/88.15 |
| 5,588,037 A * | 12/1996 | Fuller et al. .............. 379/211.02 |
| 5,596,634 A * | 1/1997 | Fernandez et al. ........ 379/210.01 |
| 5,623,539 A * | 4/1997 | Bassenyemukasa et al. ........................... 379/88.02 |
| 5,661,790 A * | 8/1997 | Hsu .......................... 379/209.01 |
| 5,991,720 A | 11/1999 | Galler |
| 6,032,040 A * | 2/2000 | Choy et al. .................. 455/414.1 |
| 6,122,614 A * | 9/2000 | Kahn et al. ..................... 704/235 |
| 6,173,266 B1 * | 1/2001 | Marx et al. ..................... 704/270 |
| 6,249,765 B1 * | 6/2001 | Adler et al. ..................... 704/500 |
| 6,252,952 B1 * | 6/2001 | Kung et al. ................. 379/114.1 |
| 6,353,810 B1 | 3/2002 | Petrushin |
| 6,363,411 B1 * | 3/2002 | Dugan et al. ................... 709/202 |
| 6,418,440 B1 * | 7/2002 | Kuo et al. ............................. 1/1 |
| 6,427,063 B1 | 7/2002 | Cook et al. |
| 6,427,137 B2 | 7/2002 | Petrushin |
| 6,445,784 B2 * | 9/2002 | Uppaluru et al. ........ 379/220.01 |
| 6,480,826 B2 | 11/2002 | Petrushin |
| 6,535,730 B1 * | 3/2003 | Chow et al. ................... 455/416 |
| 6,556,970 B1 * | 4/2003 | Sasaki et al. .................. 704/257 |
| 6,563,915 B1 * | 5/2003 | Salimando .............. 379/208.01 |
| 6,606,479 B2 | 8/2003 | Cook et al. |
| 6,665,644 B1 * | 12/2003 | Kanevsky et al. ............ 704/275 |
| 6,697,457 B2 | 2/2004 | Petrushin |
| 6,731,722 B2 * | 5/2004 | Coffey ....................... 379/88.01 |
| 6,757,362 B1 * | 6/2004 | Cooper et al. ............. 379/88.01 |
| 7,020,261 B2 * | 3/2006 | McGrath et al. ......... 379/218.01 |
| 7,158,753 B2 | 1/2007 | Kagan et al. |
| 7,197,460 B1 * | 3/2007 | Gupta et al. ............. 704/270.1 |
| 7,218,722 B1 * | 5/2007 | Turner et al. ............. 379/221.02 |
| 7,222,075 B2 | 5/2007 | Petrushin |
| 7,266,499 B2 * | 9/2007 | Surace et al. ................. 704/270 |
| 7,401,023 B1 * | 7/2008 | Schwartz et al. ............. 704/275 |
| 7,415,100 B2 * | 8/2008 | Cooper et al. ............. 379/88.01 |
| 7,499,530 B2 | 3/2009 | Carroll |
| 7,499,531 B2 | 3/2009 | Claudatos |
| 7,529,357 B1 | 5/2009 | Rae et al. |
| 7,561,680 B1 | 7/2009 | Falcone et al. |
| 7,603,273 B2 * | 10/2009 | Poirier .......................... 704/235 |
| 7,660,715 B1 * | 2/2010 | Thambiratnam ............. 704/244 |
| 7,873,523 B2 * | 1/2011 | Potter et al. .................... 704/275 |
| 8,000,973 B2 * | 8/2011 | Williams et al. .............. 704/275 |
| 8,032,114 B2 | 10/2011 | Ghiware |
| 8,073,681 B2 | 12/2011 | Baldwin et al. |
| 8,185,399 B2 * | 5/2012 | Di Fabbrizio et al. ........ 704/275 |
| 2002/0057788 A1 * | 5/2002 | Cox et al. ................. 379/265.01 |
| 2002/0107918 A1 | 8/2002 | Shaffer et al. |
| 2002/0132638 A1 * | 9/2002 | Plahte et al. ................... 455/555 |
| 2002/0172332 A1 | 11/2002 | Carroll et al. |
| 2003/0004731 A1 * | 1/2003 | Yuschik ....................... 704/275 |
| 2003/0007620 A1 * | 1/2003 | Elsey et al. .............. 379/218.01 |
| 2004/0062364 A1 * | 4/2004 | Dezonno et al. ........... 379/88.14 |
| 2004/0073431 A1 | 4/2004 | Galanes et al. |
| 2004/0085162 A1 * | 5/2004 | Agarwal et al. ................ 333/196 |
| 2004/0230637 A1 * | 11/2004 | Lecoueche et al. ............ 709/200 |
| 2004/0260543 A1 * | 12/2004 | Horowitz et al. .............. 704/221 |
| 2004/0264652 A1 * | 12/2004 | Erhart et al. .............. 379/88.01 |
| 2005/0002502 A1 * | 1/2005 | Cloran ....................... 379/88.18 |
| 2005/0033582 A1 * | 2/2005 | Gadd et al. ..................... 704/277 |
| 2005/0055211 A1 | 3/2005 | Claudatos et al. |
| 2005/0080629 A1 * | 4/2005 | Attwater et al. ............... 704/275 |
| 2005/0091057 A1 * | 4/2005 | Phillips et al. ............. 704/270.1 |
| 2005/0129216 A1 * | 6/2005 | Tsujiuchi ................. 379/265.09 |
| 2005/0152513 A1 | 7/2005 | Pence et al. |
| 2005/0154591 A1 | 7/2005 | Lecoeuche |
| 2005/0216269 A1 | 9/2005 | Scahill et al. |
| 2005/0278180 A1 * | 12/2005 | O'Neill et al. ................. 704/275 |
| 2005/0283475 A1 * | 12/2005 | Beranek et al. .................... 707/6 |
| 2006/0159240 A1 | 7/2006 | Bushey |
| 2006/0245576 A1 | 11/2006 | Henry |
| 2007/0043571 A1 * | 2/2007 | Michelini et al. .......... 704/270.1 |
| 2007/0083370 A1 | 4/2007 | Scarano et al. |
| 2007/0286359 A1 * | 12/2007 | Odinak et al. ................ 379/67.1 |
| 2008/0025489 A1 * | 1/2008 | Dye et al. ................. 379/202.01 |
| 2009/0292531 A1 * | 11/2009 | Ryan et al. ..................... 704/201 |
| 2009/0292533 A1 * | 11/2009 | Ryan et al. ..................... 704/214 |

OTHER PUBLICATIONS

European Search Report issued in EP2,124,425 on Aug. 27, 2009.
Examiner's Second Report issued in AU 2009202042 on Aug. 26, 2011.
European Search Report issued Aug. 18, 2009 for Application No. 09160938.8-2414.
European Search Report issued Aug. 27, 2009 for Application No. 09160937.0-1237.
Partial Search Report in EP09160936.2 issued Aug. 19, 2009.
Extended Search Report in EP09160936.2 issued Nov. 13, 2009.
Search Report issued in EP0916938 on Aug. 18, 2009.
Search Report issued in EP09160937 on Aug. 27, 2009.
Examiner's First Report issued in AU 2009202016 on Mar. 10, 2011.
Examiner's First Report issued in AU 2009202042 on Jan. 17, 2011.
Examiner's First Report issued in AU 2009202014 on Jan. 11, 2011.

\* cited by examiner

SYSTEM FOR HANDLING A PLURALITY OF STREAMING VOICE SIGNALS FOR DETERMINATION OF RESPONSIVE ACTION THERETO

CROSS-REFERENCE TO RELATED APPLICATIONS

The instant application is related to co-pending applications Ser. Nos. 12/470,614 and 12/470,626 filed on even date herewith.

FIELD OF THE INVENTION

The instant disclosure relates generally to techniques for the processing of a plurality of streaming voice signals and, in particular, to techniques for determining responsive actions thereto.

BACKGROUND OF THE INVENTION

Contact centers (or call centers) are well known in the art for the purpose, among others, of handling on behalf of organizations large volumes of incoming requests, complaints, queries, etc. from customers or other interested parties (collectively referred to hereinafter as "callers"). While such communications may be received in contact centers via a variety of channels (e.g., email, short message service, post, etc.), a large percentage are often received in the form of voice signals, e.g., telephone calls, placed to the contact center.

Historically, contact centers have recorded their caller interactions for both compliance and quality purposes. Compliance refers to certain legal/regulatory requirements to record calls for verification in the future, e.g., all online financial transactions in a bank could be recorded. In a similar vein, quality refers to those actions need to ensure that contact center agents at least meet minimum standards. Typically, contact centers randomly record approximately 3%-4% of their incoming calls (with the exception of agencies that have to record 100% for compliance purposes). Storage of even this small percentage of calls can be costly, and identifying issues or problems within such stored calls can be like "finding a needle in a haystack". Additionally, since the analysis of the calls is done after the fact, contact centers lose the opportunity to address problem issues when they occur, i.e., when the customer interaction is taking place. Further still, additional costs are incurred trying to make amends for the problems that have occurred and that are identified—in certain situations, the damage may already be done (e.g., mistrust by the caller has developed, loss of customer loyalty, etc.).

Thus, it would be advantageous to provide techniques that overcome these limitations of the prior art.

SUMMARY OF THE INVENTION

The instant disclosure describes techniques for processing voice signals in order to determine the need to save such voice signals for subsequent analysis, and to preferably deploy one or more responsive actions while such voice signals are still being received. As described herein, streaming voice signals, such as might be received at a contact center or similar operation, are analyzed to detect the occurrence of one or more unprompted, predetermined utterances. The predetermined utterances preferably constitute a vocabulary of words and/or phrases having particular meaning within the context in which they are uttered. For example, certain words or phrases may be of particular importance during calls in which a potential customer is requesting information about goods or services, whereas wholly different words or phrases may be of importance during an emergency call for assistance. The detection of one or more of the predetermined utterances during a call causes a determination of response-determinative significance of the detected utterance. Based on the response-determinative significance of the detected utterance, a responsive action may be further determined. Additionally, long term storage of the call corresponding to the detected utterance may also be initiated. Conversely, calls in which no predetermined utterances are detected may be deleted from short term storage. In this manner, the present invention simplifies the storage requirements for contact centers and provides the opportunity to improve caller experiences by providing shorter reaction times to potentially problematic situations.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
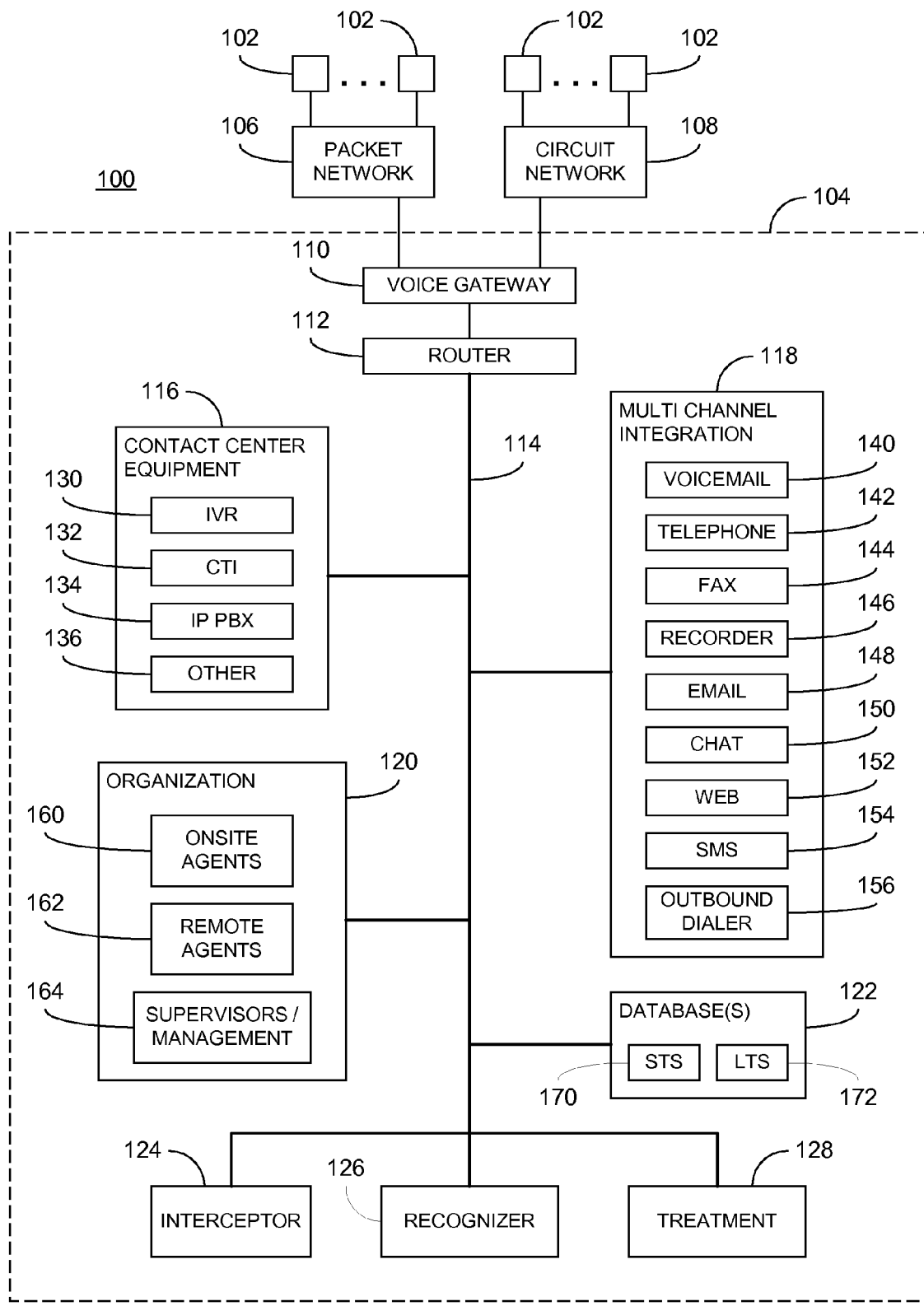
FIG. 1 is a schematic block diagram of a system in accordance with various embodiment described herein.

Referring now to FIG. 1, a system 100 in accordance with the various embodiments described herein is illustrated. In particular, the system 100 comprises a plurality of communication devices 102 operably coupled to a contact center 104 via intervening networks 106, 108. Generally, the communication devices 102 may comprise any devices capable of transmitting voice signals (when operated by a user or caller) in any convenient format over the networks 106, 108 to the contact center 104. Additionally, the communication devices 102 may be capable of providing non-voice signals, such as electronic inputs, to the contact center 104. For example, the communication devices may comprise conventional landline telephones or mobile wireless devices having the capability to generate so-called dual tone, multi-frequency (DTMF) tones or microphone-equipped computers also comprising typical user input mechanisms (e.g., keyboards, mouse and cursor, etc.) or similar devices. Preferably, the voice signals provided by the communication devices 102 are provided in a suitable digital format, although it is understood that analog signals may be employed provided that suitable analog-to-digital conversion capabilities are employed prior to analysis described below.

The communication networks may comprise any suitable networks for conveying voice (and, optionally, data) between the communication device 102 and the contact center 104. The instant disclosure is not limited by the particular implementation of the networks 106, 108. For example, two well-known types of networks are illustrated in FIG. 1—a packet-switched network 106 and a circuit-switched network 108. Examples of a suitable packet-switched network include, but are not limited to, Internet Protocol (IP)-based networks, whereas examples of circuit-switched networks include, but are not limited to, public switched telephone network (PSTN). Although illustrated separately, those of skill in the art will appreciate that such networks 106, 108 can be combined as necessary or desired. Furthermore, either wired or wireless networks, or combinations thereof, may be equally employed.

The contact center 104 preferably comprises a variety of interlinked capabilities, as shown in simplified form in FIG. 1. In particular, a voice gateway 110 receives signals from the networks 106, 108, which signals may pertain to any or all of incoming voice signals and electronic inputs as discussed below, e.g., DTMF tones, short message service (SMS) messages, email, web form data, etc. Suitable equipment for this purpose is well known to those having ordinary skill in the art. A router 112 (which, likewise, may be implemented using any suitable router hardware and/or software known to those having skill in the art) operably coupled to the voice gateway 110 routes incoming signals to the appropriate constituents within the contact center 104. As further shown, one or more communication channels 114 are provided to allow the router 112 to communicate with the various illustrated call center constituents, and to further allow such constituents to communicate with each other. The communication channels 114 may comprise any suitable network or combination of networks; in a presently preferred embodiment, networks based on the Internet Protocol (IP) suite are used. As shown, the various contact center constituents can be functionally grouped into traditional contact center equipment 116, multi-channel integration systems 118, organizational resources 120 and one or more databases 122.

The traditional contact center equipment 116 may comprise one or more interactive voice response (IVR) systems 130, one or more computer telephony integration (CTI) systems 132, IP-based private branch exchange(s) (IP-PBX) 134 and, optionally, other legacy servers 136. As known in the art, the IVR systems 130 allow callers to provide data input in response to automated prompts. CTI systems 132 integrate and/or coordinate interactions between telephone systems and computers, e.g., displaying caller information, computer controlled dialing, call center phone control, etc. The IP-PBX 134 operates as an interface between the PSTN and the contact center's internal data network, i.e., it allows voice signals to be delivered over a data network. As will be appreciated by those having skill in the art, suitable equipment of the type described above is widely available from manufacturers including, but not limited to, Avaya, Inc., Genesys Telecommunications Laboratories Inc., Nortel Networks Corp. and Cisco Systems, Inc. Finally, various other servers 136 may be provided as part of an organization's existing data networks.

Within the multi-channel integration systems 118, suitable hardware, software and management capabilities are provided for virtually any type of conventional communication channel. For example, as shown, capabilities are provided for voice mail 140, telephone 142, facsimile 144, call recorder 146, email 148, chat 150, web 152, short message service (SMS) 154 and outbound dialing 156. Using these types of systems, virtually any type of communications mode may be employed when communicating with users of the contact center 104.

As shown, the organization resources 120 comprise personnel (and any necessary supporting communication equipment, such as computers, telephones, etc.) needed to implement the specific contact center services. In particular, this includes both onsite agents 160 and remote agents 162 and their corresponding supervisors/managers 164. As known in the art, onsite agents 160 are physically co-located with the constituents 118 at one or more centralized facilities, whereas remote agents 162 are located away from the contact center facility(ies) but with remote access to the necessary constituents. In various embodiments described in greater detail below, the techniques described herein may be employed to facilitate improved handling of callers by the agents 160, 162, particularly those callers requiring greater or more specialized attention.

One or more databases 122 are also provided and made accessible via the communication channels 114. Given the volume of data that even a modestly sized contact center typically handles, the database(s) 122 are typically implemented as a so-called "server farm" comprising a plurality of suitable hardware and software server constituents co-located at one or more facilities specifically designed for maintaining such systems. Virtually any suitable server hardware and/or software components, as known to those having skill in the art, may be employed for this purpose. In embodiments described in greater detail below, both short-term storage 170 and long-term storage 172 may be employed when processing streaming voice signals. More particularly, the short-term storage 170 may be employed to temporarily store substantially all streaming voice signals (and any associated, possibly contemporaneously-received, data) received at the contact center 104. As the streaming voice signals are processed as described below, those streaming voice signals (calls) that include specific, predetermined (but unprompted) utterances may be moved to the long-term storage 172 (along with any associated data) for subsequent compliance and quality review purposes.

In one embodiment, the communication channels 114 also interconnect the various contact center constituents 116-122 with an interceptor 124, a recognizer 126 and a treatment processor 128. Each of these constituents 124-128 may be implemented using suitably programmed server hardware and/or software components as known to those of skill in the art and as described in greater detail below. Generally, the interceptor 124 operates to extract any voice signals (typically embodied as suitable network packets) from the call traffic received by the contact center 104. In a presently preferred embodiment, the interceptor 124, is connected to a port on the router 112 an operates to intercept all IP-based calls coming into the router 112, regardless of any encryption or encoding that may be applied to a given call. For each new call intercepted, a new file is opened and the call stored in the file in the short-term storage 170 as it is captured, i.e., substantially in real time. Preferably, the call is stored in the form in which it was received from the network, e.g., as IP-based network packets. Further still, each file is uniquely indexed or tagged to facilitate subsequent identification, as in the case where an indication is received from the recognizer 126 to either delete the call or move it to long-term storage 172, as described in greater detail below. Because calls are almost always duplex communications (i.e., two-way conversations), the streaming voice signal being stored and analyzed preferably includes any voice responses provided by the agent handling the call. As used herein, a streaming signal refers to the state of being substantially continuous and freeform in nature, as in the case of naturally-spoken language and in contrast to prompted or otherwise artificially-structured voice signals. Additionally, any electronic inputs (e.g., IVR data, caller ID data, etc.) that is received along with the call are stored as part of the call, i.e., in network packet form in which it is received.

The recognizer 126 implements speech recognition processing in order to detect occurrences of unprompted, predetermined utterances in streaming voice signals. As used herein, an utterance comprises a spoken word or phrase, i.e., a natural unit of spoken speech bounded by silence or pauses, as opposed to a general feature of a voice signal (e.g., one or more physical or statistical properties of the voice signal, such as formant frequencies, speech energy, statistics or rates of change thereof, etc.). Thus, a predetermined utterance is a designation of an utterance of particular interest for a given context. For example, in the context of a contact center fielding calls placed to a customer service hotline, predetermined utterance may include utterances that are indicative that a given customer is especially displeased. Thus, utterances such as "cancel my account", "terrible", "inadequate" may be designated as predetermined utterances. Alternatively, in the case where calls are being placed to an emergency response service, utterance such as "fire", "trapped", "injured", etc. may be designated as predetermined utterances. It is understood, however, that the instant disclosure need not be limited to predetermined utterances that are indicative of a bad experience or an emergency, and could be chosen on some other basis, e.g., a customer having a good experience. The contextual uniqueness of predetermined utterances as used herein, as opposed to physical/statistical properties of voice signals, allows greater precision when determining whether to preserve voices signals for subsequent analysis and when determining how best to respond to a particular caller. That is, understanding of the actual content of a voice signal improves the accuracy, reliability and speed with which such determinations may be made than would otherwise be possible with only an understanding of the physical/statistical properties of the voice signal. Further still, greater flexibility in accommodating different context is provided through the recognition of predetermined utterances.

Regardless, the recognizer 126 performs speech recognition techniques on incoming streaming voice signals in an attempt to detect occurrences of the predetermined utterance or utterances. Generally, any suitable speech recognition technique known to those skilled in the art and capable of operating in real time or near-real time may be employed. For example, speech recognition techniques may be generally characterized two ways, techniques employing wave pattern recognition and techniques employing phoneme recognition. In the former, particular sound waves to be recognized (representative of, in the instant scenario, of the predetermined utterances) are provided as input to the recognizer 126 that subsequently attempts to compare the targeted sound waves with incoming speech waveforms in order to identify a match. In the latter, statistical analysis techniques are employed in an attempt to recognize the occurrence of smaller portions of speech (i.e., phonemes) that, when combined appropriately, are representative of the desired predetermined utterance. For example, the so-called Hidden Markov Model (HMM) approach is an example of the latter class of techniques that may be employed herein. Those having ordinary skill in the art will further appreciate that still other techniques, or combinations of techniques, may be employed without loss of generality. Indeed, it is anticipated that, as improved speech recognition techniques are developed, they may be beneficially employed in the context of the instant disclosure.

When the recognizer 126 detects a predetermined utterance, it likewise determines response-determinative significance of the detected utterance. As used herein, a response-determinative significance is an indication of why a particular detected utterance is important in a given context, which in turn informs a subsequent decision concerning how to respond, if at all. This is accomplished based on a context in which the detected utterance was identified as well as the identification of the specific detected utterance. For example, in one embodiment, tables may be employed according to certain contexts. That is, for a given context, a table of predetermined utterances and associated significances may be provided. Referring once again to the previous examples, one table may be provided for detected utterances from calls directed to a customer service hotline. In this case, each of the predetermined utterances (e.g., "cancel my account", "terrible", "inadequate") may have a response-determinative significance associated therewith in the table (e.g., "requires supervisor escalation", "likely loss of customer", "potential loss of customer", respectively). Alternatively, a table may be provided for detected utterances from calls directed to an emergency response service. In this case, each of the predetermined utterances (e.g., "fire", "trapped", "injured") may have a different response-determinative significance associated therewith in the table (e.g., "initiate fire department contact", "use script X", "use script Y", respectively). Of course, those having skill in the art will appreciate that the above-described examples are merely illustrative of the myriad context dependent possibilities that may arise in practice.

In addition to searching for occurrences of predetermined utterances and their corresponding response-determinative significance, the recognizer 126 also operates to provide indications to the interceptor 124 whether to retain or delete each of the temporarily stored streaming voice signals. Thus, in one embodiment, if one or more of the unprompted predetermined utterances are detected during a streaming voice signal, the recognizer 126 provides an indication to move the streaming voice signal from short term storage to long term storage (a save indication). On the other hand, when a streaming voice signal is discontinued (i.e., when a call is completed), the recognizer 126 may provide an indication that the streaming voice signal should be deleted from short term storage (a delete indication). It is understood that, rather than providing affirmative indications to either save or delete a streaming voice signal in short term storage, such operations could be achieved through negative indications, i.e., deleting a streaming voice signal when a save indication is not received prior to discontinuation of the streaming voice signal, or storing the streaming voice signal in long term storage when a delete indication is not received prior to discontinuation of the streaming voice signal. Regardless, the various embodiments described herein are not limited by the particular form of the save and/or delete indications, which may be selected as a matter of design choice. In an alternative embodiment, the retain/delete determination may occur not upon the detection of one or more predetermined utterances, but only after the identification of the response-determinative significance. In this manner, equivocal situations may be avoided when making the retain/delete determination.

For example, in those instances in which more than one predetermined utterance is detected during a call, the net effect of the multiple detected utterances may lead to an equivocal determination of the response-determinative significance. Building off of the previous customer service hotline example, if a caller says "I'm sorry my last payment was inadequate, I don't want you to cancel my account", the occurrence of "inadequate" and "cancel my account" would appear to indicate that the caller is dissatisfied and wants to cancel his/her account, whereas the words "sorry" and "don't" could be interpreted otherwise. That is, clearly this example is a situation in which a placating approach is not required, even though certain keywords indicating otherwise were detected. In this situation, it is likely that no set of rules would apply (i.e., the table lookup described above would be inconclusive). In situations such as these, in one embodiment, default handling would cause the call to be stored for subsequent analysis to possibly determine a new rule for dealing with similar occurrences in the future.

The treatment processor 128 is the interface between the recognizer 126 and the other constituents 116-120 of the contact center 104. That is, based at least in part upon the data/indications provided by the recognizer 126, the treatment processor 128 determines any necessary or desired responsive action and interacts with the other constituents 116-120 (i.e., the response implementation constituents) to carry out the responsive action. To this end, the treatment processor 128 operates upon the response-determinative significances and, optionally, the detected utterances themselves, as provided by the recognizer 126. Additionally, the treatment processor 128 may operate upon other electronic inputs (e.g., IVR inputs, associated telecommunication data such as caller ID data, etc.) when determining the responsive action, as described in greater detail below.

Figure 2:
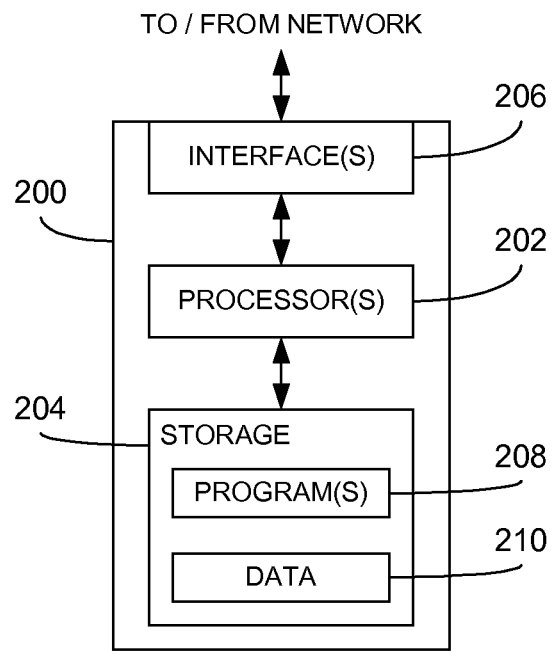
FIG. 2 is a schematic block diagram of an apparatus suitable for implementing various embodiments described herein.

Referring now to FIG. 2, an embodiment of an apparatus suitable for implementing any of the above-described constituents 124-128 is further illustrated. In particular, the apparatus 200 comprises one or more processing devices 202 operably coupled to at least one storage device 204. Furthermore, the processing device(s) 202 are also operably coupled to one or more interfaces 206. In one embodiment, the processing device(s) 202 may be embodied as one or more microprocessors, microcontrollers, digital signal processors, co-processors such as graphics co-processors, similar devices or combinations thereof, as know in the art. Similarly, the storage device(s) 204 may comprise any suitable media capable of being read by the one or more processing devices 202, such as volatile or non-volatile memory devices including random access memory (RAM) and/or read only memory (ROM). Examples of storage devices include, but not limited to, disc drives, solid-state memory drives, removable storage media such as magnetic or optical discs, thumb drives, etc. In one embodiment, the interface(s) 206 comprise a network interface that allows the apparatus 200 to communicate with one or more suitable communication networks, e.g., network 114. Examples of a suitable network interface include, but is not limited to, one or more Ethernet ports. Such interfaces are typically implemented using known combinations of hardware, firmware, or software. The interface(s) 206 may also include interfaces suitable for use by humans, e.g., a graphical user interface, keyboard, mouse and cursor arrangements, speakers, microphones, etc. Once again, techniques for implementing such user input/output devices are well known to those having skill in the art. As shown, the storage device(s) 204 include one or more programs (or applications) 208 as well as any operational data 210 used during execution of the one or more programs 208. In particular, the program(s) 208 comprise instructions (i.e., software object code) that may be executed by the one or more processing devices 202 to implement the functionality described herein. Techniques for developing and deploying programs in this manner are well know in the art. In a similar vein, the operational data 210 comprises any data, often transitory in nature, used by or otherwise operated upon by the program(s) 208 when being executed by the one or more processing devices 202. With these basic constituents, the processing device 200 may take any of a number of different forms, such as a desktop or laptop computer or a server computer. The present invention is not limited in this regard. Furthermore, to the extent that the apparatus 200 relies on the use of suitable programs 208 being executed by the one or more processors 202, those of skill in the art will appreciate that other implementations are equally employable as a matter of design choice. For example, at least some portion of software-implemented functionality may instead be implemented using known dedicated hardware techniques, such as application specific circuits, programmable logic arrays, etc. Again, the instant disclosure is not limited in this regard.

While the interceptor 124, recognizer 126 and treatment processor 128 have been described above as separate entities and may be implemented separately using, for example, separate computer-based platforms, those having ordinary skill in the art will appreciate that these constituents 124-128 can be implemented in combination. For example, in one embodiment, it may be desirable to implement the interceptor 124 and the recognizer 126 within a single hardware/software platform (i.e., one or more co-located server computers and associated server and application software) and, further still, in substantially proximity to (i.e., within the same local network of) the router 112. Those having ordinary skill in the art will appreciate that implementation of the interceptor 124, recognizer 126 and treatment processor 128 described herein are illustrative only and that such constituents are susceptible to a wide variety of implementations.

Figure 3:
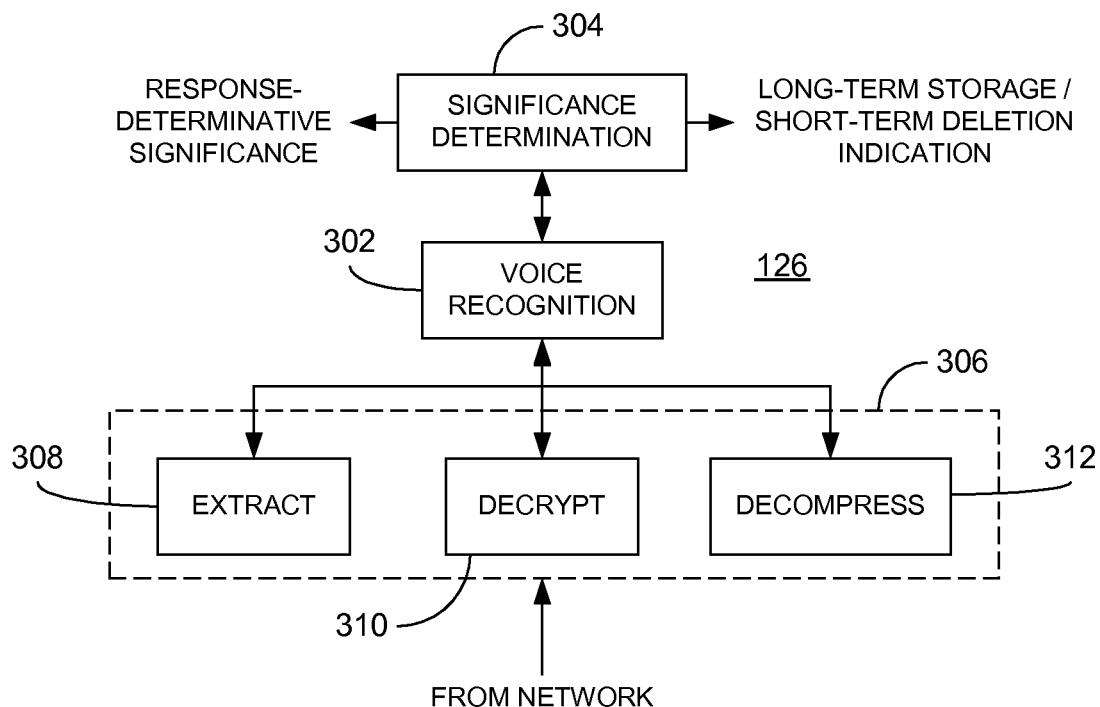
FIG. 3 is a block diagram illustrating an implementation of a recognizer in accordance with an embodiment described herein.

Referring now to FIG. 3, a specific implementation of a recognizer 126 is further illustrated. In particular, the recognizer 124 comprises a voice recognition component 302 operably coupled to a significance determination component 304 and, optionally, a conversion components 306. Using the voice recognition techniques described above, the voice recognition component 302 operates upon one or more streaming voice signals received (optionally via the conversion component 306) from a network or similar means of conveying the streaming voice signals. As will be appreciated by those of skill in the art, the voice recognition component 302 may operate on a "threaded" basis whereby multiple streaming voice signals are processed separately as individual threads or processes, each having its own continuously updated state information. Such implementations are typically limited only by the availability of sufficient processing resources to provide substantially real time processing capabilities. Alternatively, multiple voice recognition components 302 may be provided in those instances where each voice recognition component 302 is capable of handling only a single streaming voice signal. Of course, other combinations of multiple and/ or single thread voice recognition components may be employed as a matter of design choice. Regardless, each streaming voice signal (corresponding to a single call and the responses of a handling agent) is uniquely assigned to a given thread (in the case of multi-threaded processing) or dedicated voice recognition component (in the case of single-thread processing) for the duration of the streaming voice signal.

As noted, the streaming voice signals provided to the voice recognition component 302 are received from a network or similar channel. Preferably, the streaming voice signals received from the network are provided in a format that facilitates their immediate analysis by the voice recognition component, i.e., digitally-represented baseband voice samples. However, it is often the case that voice signals transmitted via a network are processed and/or encapsulated to facilitate their transfer via the network. To this end, the conversion component 306 may be provided to reverse any such processing/encapsulation to provide analyzable voice signals to the voice recognition component 302.

In particular, the conversion component 306 may comprise an extraction component 308 that operates to extract the streaming voice signal from network packets. As known in the art, data (or voice signals) to be transmitted over a network often have so-called "headers" or similar information appended thereto in order assist the network equipment when routing the data from one point to another within the network according to a transport protocol. Alternatively, such encapsulation processing may also comprise channel error encoding to which, as known in the art (particularly where wireless channels are employed), helps prevent channel-induced errors from being introduced into the transmitted data. Once received at the targeted destination, such routing information is stripped from the received packets, or the error coding information applied to ensure data integrity, by the extraction component 308.

In some instances, the data transported within a network is first encrypted prior to encapsulation for transport to ensure the security of the data. To this end, a decryption component 310 may be provided to decrypt any previously encrypted data. The present disclosure is not limited by the particular encryption/decryption technique used. In a similar vein, data is often compressed prior to transmission (i.e. prior to any encryption, error encoding and/or addition of routing headers) in order to decrease the amount of data to be transmitted. In these instances, a decompression component 312 is provided to undo any prior compression. Once again, the instant disclosure is not limited by the particular compression/decompression technique employed.

As the voice recognition component 302 analyzes a given streaming voice signal, it provides various information to the significance determination component 304 depending on whether it detects any unprompted, predetermined utterances, as described above. For example, the voice recognition component 302 may provide the significance determination component 304 with state data corresponding to a given streaming voice signal. Such state data may include start and stop indications for the voice signal, as well as any detected utterances identified by the voice recognition component 302, if any. In those instances in which no detected utterances are identified after both the start and stop indications for the voice signal have been received, then the significance determination component 304 can (but not necessarily always) provide a short-term deletion indication to the interceptor 124 indicating that the streaming voice signal can be deleted from long term storage. Conversely, if one or more detected utterances are provided by the voice recognition component 302 prior to the stop indication being received, then the significance determination component 304 can provide both a response-determinative significance to the treatment processor 128 and a long term storage indication to the interceptor 124.

Figure 4:
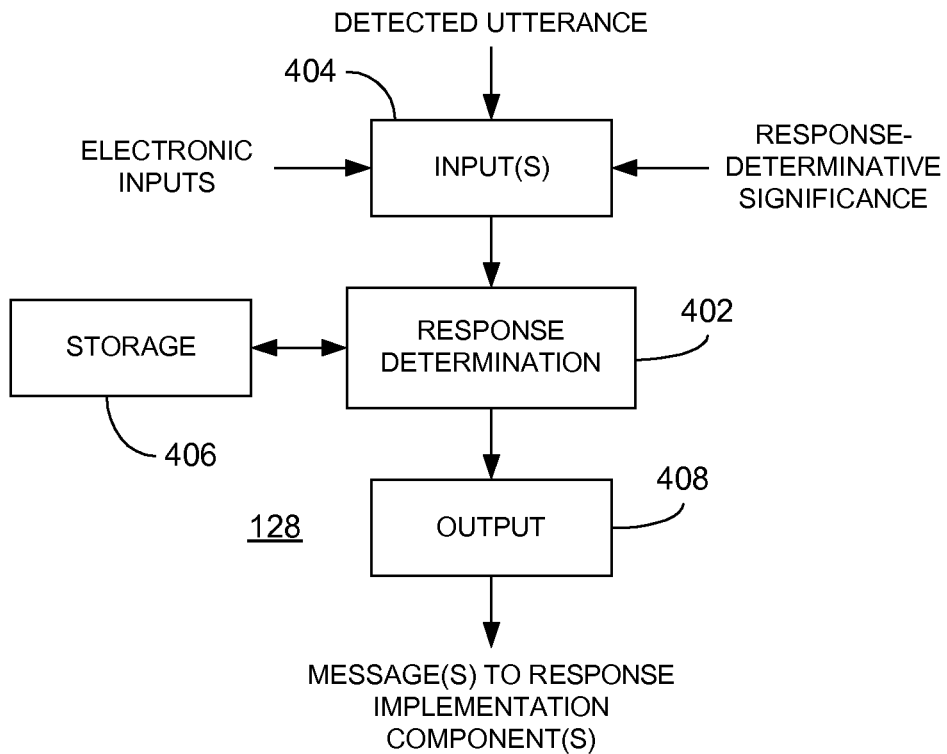
FIG. 4 is a block diagram illustrating an implementation of a treatment processor in accordance with an embodiment described herein.

Referring now to FIG. 4, a specific implementation of a treatment processor 128 is further illustrated. In particular, a response determination component 402 is provided operably coupled to an input component 404, a storage component 406 and an output component 408. The response determination component 402 receives as input, at a minimum, the response-determinative significance(s) of one or more detected utterances, and optionally, the detected utterance itself as well as any electronic inputs corresponding to a given streaming voice signals, as shown. In one embodiment, these inputs are provided by one or more input components 404 that operate to receive these inputs from the recognizer 126 (in the case of the response-determinative significance(s) and detected utterance(s)) or the sources of the electronic inputs. For example, in a computer-implemented embodiment of the treatment processor 128, the input component(s) may comprise a memory-mapped register, a memory controller, interrupt routine or other suitable mechanism for receiving data. In another embodiment in which the treatment processor 128 is combined with the recognizer 126, the input component may simply comprise a suitable memory location with these inputs are stored for subsequent operation by the response determination component 402.

Regardless of the manner in which these inputs are obtained, the response determination component 402 determines a responsive action based at least upon the response-determinative significance(s) of the detected utterance(s). Once again, the determination of the responsive action will depend on the nature of the call being analyzed and the configuration of the contact center 104. For example, upon detecting any predetermined utterance indicative of an emergency (i.e., "I'm hurt", "fire", etc.), the responsive action could be to conference in an emergency services dispatcher or take an even more urgent action if, for example, the caller identification (or other electronic input, as noted above) indicates that the caller may be particularly vulnerable to a delayed response, e.g., a call from an elementary school or a senior citizen care facility. Alternatively, if, in a customer service call center context, predetermined utterance associated with an angry customer is detected, then the responsive action could be to transfer the call to a specialist. Further still, historical data (residing in the storage 406) may be incorporated into the determination. For example, a caller's credit score may be used to determine what type of offer he/she should be offered when a certain predetermined utterance is detected. Once again, a wide variety of other types of historical information (i.e., information that is not obtained contemporaneously with the call) may be employed for this purpose.

Once the responsive action is determined, it may be stored in the storage component 406 as part, for example, of a customer history log or the like as evidence of how interactions with the particular caller have proceeded in the past. Finally, the output component 408 takes as input the responsive action (which may, in fact, comprise multiple actions to be carried out) and provides as output an messages, control signals or the like necessary to cause response implementation components (e.g., various ones of the contact center constituents 116-120) to carry out the responsive action. The instant disclosure is not limited by the particular form of the messages employed by the output component 408 for this purpose, and those of skill in the art will appreciate that such messages may be structured as a matter of design choice.

Figure 5:
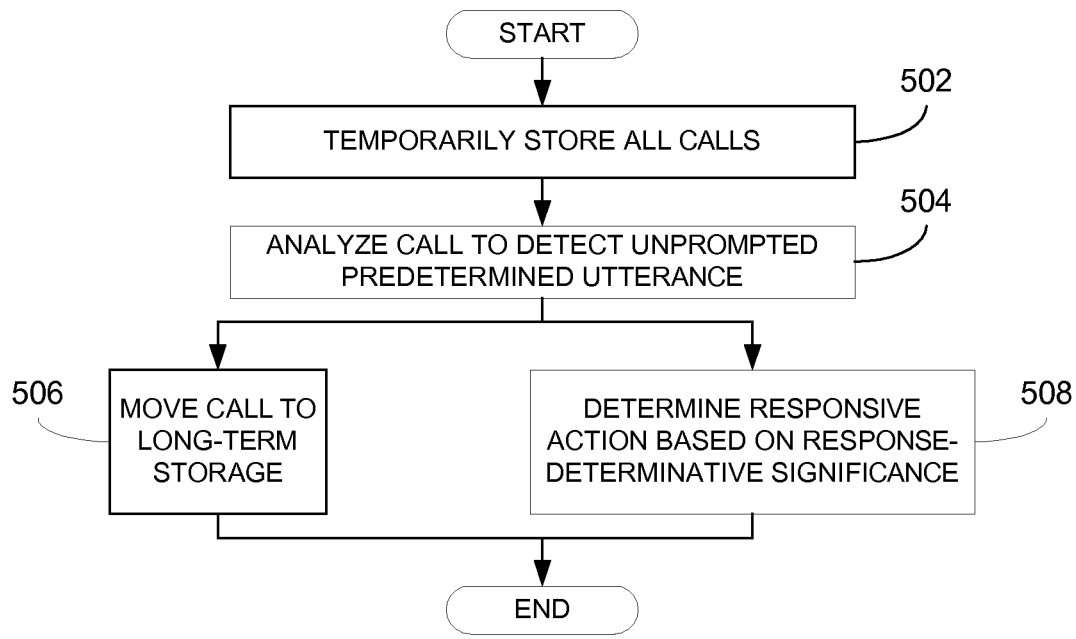
FIG. 5 is a flowchart illustrating system-level processing in accordance with an embodiment described herein.

Referring now to FIG. 5, a flow chart illustrating system-level processing is provided. In particular, the processing illustrated in FIG. 5 is preferably carried out by the interceptor 124, recognizer 126 and treatment component 128 described above. Thus, beginning at block 502, the interceptor 124 intercepts substantially all calls (i.e., streaming voice signals) coming in to the contact center 104 and temporarily stores them in short term storage. Thereafter, at block 504, the recognizer 126 analyzes a call as it is stored in short term storage, i.e., in real time or near real time (i.e., delayed by an amount of time shorter than the duration of the call itself). In the event that one or more detected utterances lead to a determination of response-determinative significance for the call (also performed at block 504), processing continues in parallel at blocks 506 and 508. At block 506, the recognizer 126 provides an appropriate indication to the interceptor 128 to move the call to long term storage, preferably, once the call has completed. Likewise, at block 508, the responsive action is determined is based on the response-determinative significance(s) of the detected utterance(s) by the treatment processor 128 at any time during or after the call.

Figure 6:
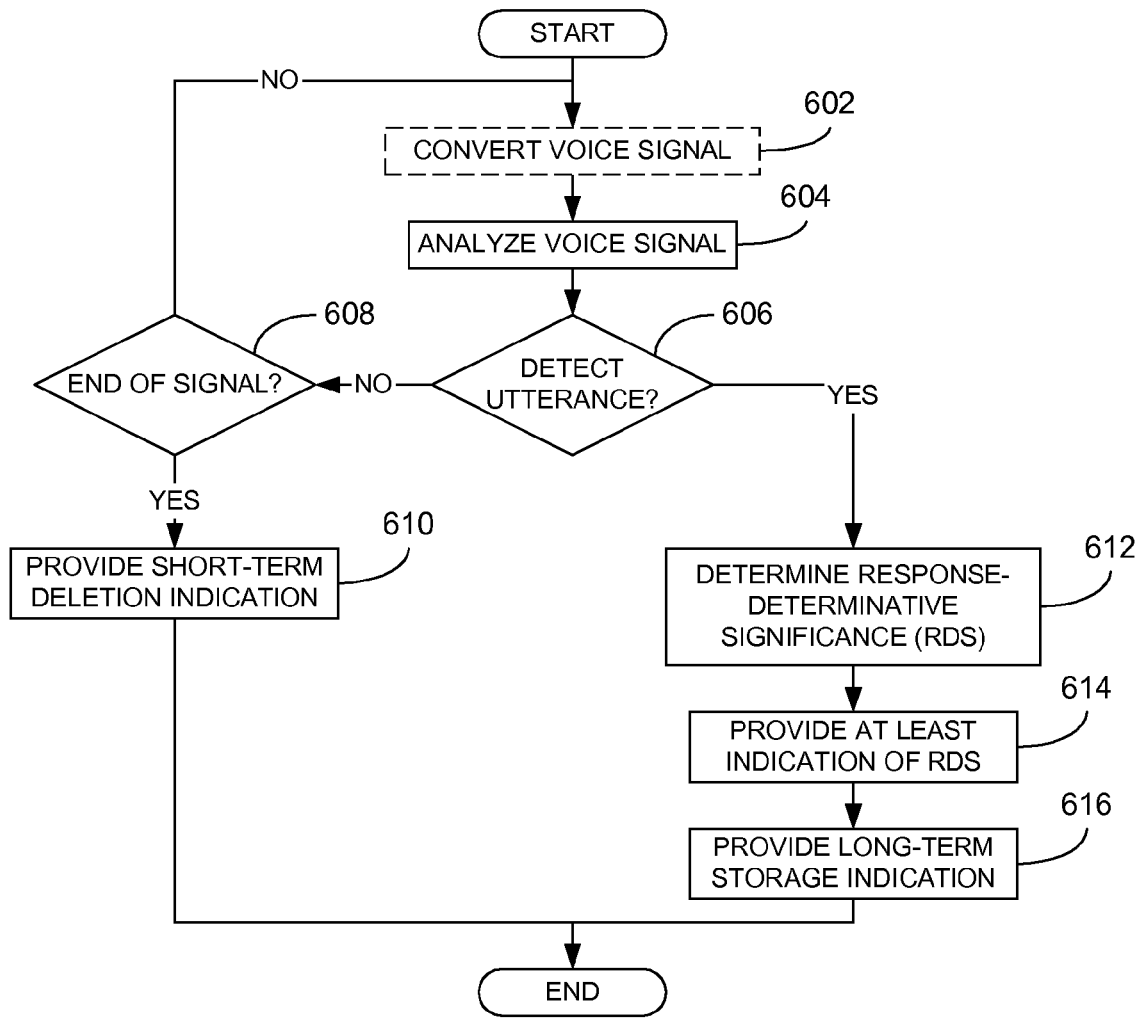
FIG. 6 is a flowchart illustrating processing performed by a recognizer in accordance with an embodiment described herein.

Referring now to FIG. 6, a flow chart illustrating processing performed by the recognizer is shown. Beginning at block 602, an incoming streaming voice signal may be optionally converted to an analyzable form, as described above. Although this functionality is described herein as part of the recognizer, those of skill in the art will appreciate that such conversions could be performed by another constituent (e.g., the interceptor) prior to providing the streaming voice signal to the recognizer. Regardless, at block 604, the streaming voice signal is analyzed in accordance with the above-described methods. In practice, this is typically done by taking short samples of the streaming voice signal (e.g., 10 to 100 milliseconds worth of base band voice samples) and performing the speech recognition processing thereon. If not predetermined utterance is detected, as illustrated by block 606, processing continues at block 608 where it is determined if the end of the streaming voice signal has been reached. If not, processing continues at blocks 602 and 604 where further portions of the streaming voice signal are analyzed in this manner. If, however, the end of the voice signal is received prior to any detected utterances, processing continues at block 610 where an indication is provided to delete the streaming voice signal from the short term storage.

If one of the unprompted, predetermined utterances is detected at block 606, processing continues at block 612 where the response-determinative significance of the detected utterance is determined, as described above. Thereafter, at blocks 614 and 616 respectively, an indication of the response-determinative significance is provided, as is an indication to move the streaming voice signal into long term storage. As used herein, the indication of response-determinative significance may comprise the response-determinative significance alone or may include the detected utterance itself as well.

Figure 7:
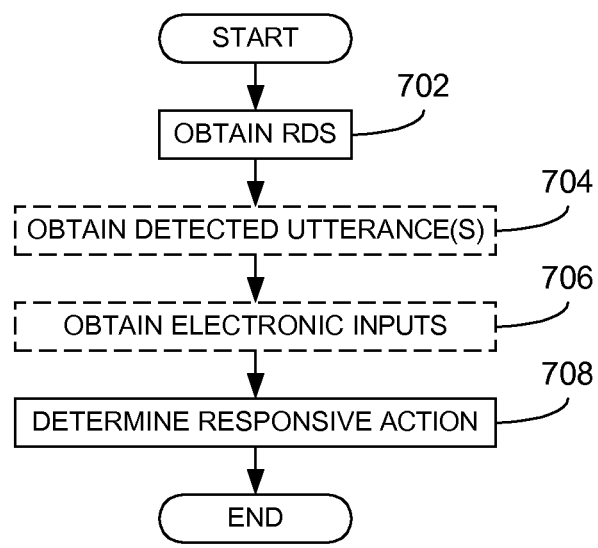
FIG. 7 is a flowchart illustrating processing performed by a treatment processor in accordance with an embodiment described herein.

Finally, and with reference to FIG. 7, a flow chart illustrating processing performed by the treatment processor is shown. In particular, beginning at block 702, at least one response-determinative significance corresponding to one or more detected utterances are obtained by the treatment processor. As used herein, the treatment processor "obtains" information by either receiving it from another entity, e.g., the recognizer, or, in an alternative embodiment, directly determining it, e.g., in the case where the recognizer and the treatment processor are combined. Likewise, at blocks 704 and 706, respectively, the one or more detected utterances and/or electronic inputs may likewise be obtained by the treatment processor. Thereafter, at block 708, the treatment processor determines a responsive action based on the previously-obtained response-determinative significance, detected utterance and/or electronic inputs, as described above.

The instant disclosure describes an architecture and method for analyzing customer interactions in real-time and applying customer analytics. In this manner, substantially real time determination can be made whether to store a given streaming voice signal for subsequent quality/compliance analysis, and to determine optimal response strategies while the opportunity exists to provide the best possible caller experience. For at least these reasons, the above-described techniques represent an advancement over prior art teachings.

While particular preferred embodiments have been shown and described, it will be obvious to those skilled in the art that changes and modifications may be made without departing from the instant teachings. For example, although the example of a contact center has been used throughout this disclosure, it is understood that the teachings described herein could be equally applied in another environment in which it may be desirable, for example, to selectively store streaming voice signals. It is therefore contemplated that any and all modifications, variations or equivalents of the above-described teachings fall within the scope of the basic underlying principles disclosed above and claimed herein.

What is claimed is:

1. A system for use in processing a plurality of calls coming into a contact center, each of the plurality of calls comprising a streaming voice signal, the system comprising:
   an interceptor operable to receive the plurality of calls;
   a recognizer, operably coupled to the interceptor, operable to continuously analyze a call between a caller and a human agent of the plurality of calls to detect, within the streaming voice signal, occurrence of an unprompted predetermined utterance having response-determinative significance to provide a detected utterance; and
   a treatment processor, operably coupled to the recognizer, operable to determine a responsive action based on the response-determinative significance corresponding to the detected utterance and at least one of historical data and a configuration of the contact center, and further operable to perform the responsive action for the caller without action from the human agent; and
   wherein the detected utterance indicates that assistance from a third-party, other than the human agent, is needed.

2. The system of claim 1, wherein the interceptor is further operable to identify and extract the streaming voice signal corresponding to each of the plurality of calls from network traffic routed to the call center.

3. The system of claim 1, wherein the interceptor is further operable to:
   temporarily store, in short term storage, each call of the plurality of calls;
   move, from the short term storage to long term storage, those calls of the plurality of calls for which a save indication is received from the recognizer; and
   delete, from the short term storage, those calls of the plurality of calls for which a delete indication is received from the recognizer.

4. The system of claim 3, wherein the recognizer is further operable to:
   provide, to the interceptor, the save indication in response to the detected utterance.

5. The system of claim 1, wherein the recognizer is further operable to:
   provide, to the treatment processor, the response-determinative significance corresponding to the detected utterance.

6. The system of claim 1, wherein the treatment processor is further operable to provide an indication to modify at least one response of the human agent to a caller initiating the call as the responsive action.

7. The system of claim 1, wherein the treatment processor is further operable to redirect the call to a third party as the responsive action.

8. The system of claim 1, wherein the treatment processor is further operable to request a third party to monitor the call substantially in real time as the responsive action.

9. The system of claim 1, wherein the treatment processor is further operable to initiate a specific response sequence for a caller initiating the call as the responsive action.

10. The system of claim 1, wherein the treatment processor is further operable to initiate a follow-up call to a caller initiating the call subsequent to termination of the call.

11. The system of claim 1, wherein the treatment processor is further operable to:
receive electronic inputs from the caller; and
determine the responsive action based on the electronic inputs and the response-determinative significance of the detected utterance.

12. The system of claim 1, wherein the treatment processor is further operable to:
receive the detected utterance from the recognizer; and
determine the responsive action based on the detected utterance and the response-determinative significance of the detected utterance.

13. The system of claim 1 wherein the streaming voice signal includes voice responses provided by the human agent.

14. The system of claim 1 wherein the predetermined utterance indicates that the caller is a displeased customer.

15. The system of claim 1 wherein the predetermined utterance indicates that the caller requires emergency services.

16. The system of claim 1 wherein the responsive action is further based on a second response-determinative significance corresponding to a second detected utterance recognized during the call.

17. The system of claim 16 wherein the responsive action is to store information regarding the call when the response-determinative significance and the second response-determinative significance are conflicting.

18. In a contact center receiving a plurality of calls, each of the plurality of calls comprising a streaming voice signal, a method for processing the plurality of calls, comprising:
continuously analyzing, by a recognizer, a call between a caller and a human agent of the plurality of calls to detect occurrence of an unprompted predetermined utterance having response-determinative significance to provide a detected utterance; and
determining, by a treatment processor operably coupled to the recognizer, a responsive action based on the response-determinative significance corresponding to the detected utterance and at least one of historical data and a configuration of the contact center;
performing, by the treatment processor, the responsive action for the caller without action from the human agent; and
wherein the detected utterance indicates that assistance from a third-party, other than the human agent, is needed.

19. The method of claim 18, further comprising:
temporarily storing, by an interceptor operably coupled to the recognizer, the plurality of calls.

20. The method of claim 19, further comprising:
moving, by interceptor, storage of the call from short term storage to long term storage based on detection of the detected utterance.

21. The method of claim 18, wherein the responsive action is providing an indication to modify at least one response of the human agent to a caller associated with the call.

22. The method of claim 18, wherein the responsive action is providing an indication to redirect the call to a third party.

23. The method of claim 18, wherein the responsive action is providing an indication to request a third party to monitor the call substantially in real time.

24. The method of claim 18, wherein the responsive action is providing an indication to initiate a specific response sequence for a caller associated with the call.

25. The method of claim 18, wherein the responsive action is providing an indication to initiate a follow-up call to a caller associated with the call subsequent to termination of the call.

26. The method of claim 18, further comprising:
receiving, by the treatment processor, electronic inputs from the caller; and
determining the responsive action based on the electronic inputs and the response-determinative significance of the detected utterance.

27. The method of claim 18, further comprising:
determining the responsive action based on the detected utterance and the response-determinative significance of the detected utterance.

\* \* \* \* \*